United States Patent [19]

Conley

[11] Patent Number: 5,639,394
[45] Date of Patent: Jun. 17, 1997

[54] ELECTROFUSION FORMED VALVE ASSEMBLY

[75] Inventor: Richard W. Conley, Oakmont, Pa.

[73] Assignee: Kerotest Manufacturing Corp., Pittsburgh, Pa.

[21] Appl. No.: 381,096

[22] Filed: Jan. 31, 1995

[51] Int. Cl.⁶ .............................. H05B 3/48; F16K 49/00; B29C 65/00
[52] U.S. Cl. .......................... 219/535; 219/544; 137/341; 251/148; 156/304.2; 156/304.6
[58] Field of Search ............................ 219/535, 544; 285/41; 137/341; 251/148; 156/158, 274.2, 304.2–304.3, 304.6, 309.6

[56] References Cited

U.S. PATENT DOCUMENTS

| | | | |
|---|---|---|---|
| 2,933,428 | 4/1960 | Mueller | 154/116 |
| 3,025,086 | 3/1962 | Mosely | 285/250 |
| 3,656,711 | 4/1972 | Toelke | 251/151 |
| 3,987,276 | 10/1976 | Vogelsanger et al. | 219/535 |
| 4,005,880 | 2/1977 | Anderson et al. | 285/47 |
| 4,348,006 | 9/1982 | Schmitt et al. | 251/288 |
| 4,486,650 | 12/1984 | Bridgstock et al. | 219/544 |
| 4,523,740 | 6/1985 | Paitchell | 251/351 |
| 4,553,562 | 11/1985 | Nakada | 137/375 |
| 4,571,488 | 2/1986 | Reeves | 219/544 |
| 4,602,148 | 7/1986 | Ramsey | 219/535 |
| 4,642,155 | 2/1987 | Ramsey | 156/359 |
| 4,682,797 | 7/1987 | Hildner | 285/40 |
| 4,705,058 | 11/1987 | Marklew | 137/15 |
| 4,712,809 | 12/1987 | Legris | 285/21 |
| 4,842,305 | 6/1989 | Kistenich et al. | 156/274.2 |
| 4,997,214 | 3/1991 | Reese | 285/174 |
| 5,182,440 | 1/1993 | Dufour et al. | 219/535 |
| 5,229,581 | 7/1993 | Boulet d'Auria | 219/535 |
| 5,265,652 | 11/1993 | Brunella | 141/59 |
| 5,280,760 | 1/1994 | Toomey et al. | 29/33 |
| 5,321,233 | 6/1994 | Barrett et al. | 285/41 |
| 5,363,541 | 11/1994 | Toomey et al. | 29/890.14 |

OTHER PUBLICATIONS

"Users Guide for the Selection of an Electrofusion System for Polyethylene Gas Pipe", S.C. Grigory, Gas Research Institute, Jun., 1994.

*Primary Examiner*—Teresa J. Walberg
*Assistant Examiner*—Raphael Valencia
*Attorney, Agent, or Firm*—Price & Adams

[57] ABSTRACT

An electrofusion coupling having an encapsulated electrical resistance heating element for fusing together the ends of polyethylene conduit is converted into a valve body by drilling a bore through the wall of the coupling into the flow passage which forms a valve chamber. A valve stem is inserted through an open end of the coupling and upwardly through the bore. A lower end of the stem is retained in the valve chamber and an upper end is connected to an actuator cap for rotating the stem. A ball closure member is then inserted through an open end of the coupling into the chamber for connection to the lower end of the valve stem. Rotation of the stem in the coupling moves the valve member between open and closed positions in the chamber. Polyethylene pipe fittings supporting spring biased valve seats are pressed through the ends of the coupling to capture and center the ball closure member between the seats in the valve chamber. Current supplied to the heating element heats the thermoplastic material under pressure at the interface between the coupling and the pipe fittings to a temperature where the thermoplastic material softens and flows together to fuse the coupling to the pipe fittings. The current to the heating element is terminated and the coupling is fused to the pipe fittings to form a unitary valve body with the closure member and stem to complete the valve assembly.

20 Claims, 9 Drawing Sheets

ELECTROFUSION FORMED VALVE ASSEMBLY

BACKGROUND OF THE INVENTION

1. Field of the Invention

This invention relates to a polyethylene valve assembly and, more particularly, to a valve assembly having a polyethylene valve body formed by electrofusing a coupling to pipe end fittings.

2. Description of the Prior Art

In the underground conveyance of natural gas polyethylene conduit is replacing iron and steel conduits which were predominantly used prior to the development of polyethylene conduit for distribution service lines. The metal composition of iron and steel conduit used underground makes it susceptible to corrosion and deterioration due to cathodic action.

Not only is polyethylene being used to fabricate gas pipelines, it is also being used in the fabrication of valves for controlling gas flow through the pipelines. Polyethylene ball valves and plug valves are commercially available for installation in gas distribution systems. U.S. Pat. Nos. 3,656,711; 4,348,006; 4,523,740; 4,553,562; and 4,705,058 are representative of known polyethylene control valves. The ends of a polyethylene valve are conventionally connected to polyethylene conduit by butt fusion or by an electrofusion coupling.

Polyethylene conduit used for natural gas service provides the long term benefits of corrosion resistance and durability. The joints between pipelines and polyethylene valves can be made without the need for conventional mechanical connections. The use of butt fusion and electrofusion to connect the end fittings of a valve with a pipeline eliminate the need for conventional threaded connections and fastening nuts.

In a conventional electrofusion system a sleeve of thermoplastic material, such as polyethylene, includes a coil of resistance heating wire encapsulated within the body of the sleeve. The heating wire extends the length of the sleeve. The ends of the heating wire are connected to terminals for supplying electrical current from power control equipment to the wire. The ends of a pair of polyethylene (PE) pipes are pressed into the sleeve.

Electrical connections to the sleeve terminals are made, and then a predetermined current is supplied for a controlled period of time to heat the sleeve. The sleeve is heated to its melting temperature so that the thermoplastic material forming the sleeve softens. Heat from the sleeve is transmitted by conduction to the pipe ends at the interface with the sleeve. The thermoplastic material of the pipe ends softens so that the material forming the sleeve and the pipe ends flows together.

When the sleeve and the pipe ends have been heated to a melting temperature and the pipe ends are fused to the sleeve, current to the coupling is terminated and the sleeve is allowed to cool. Once the sleeve cools to a preselected temperature, the pipe ends and the sleeve are fused together to complete the electrofusion coupling. The joint formed by the electrofusion coupling is stronger than the pipe. In other words, in a shear test the pipe fails before the joint between the pipe ends and sleeve fails. U.S. Pat. Nos. 4,486,650; 4,571,488; 4,602,148; 5,229,581; 5,280,670; and 5,363,541 disclose electrofusion systems for forming joints between PE pipes.

Valves fabricated of thermoplastic material are composed of parts which are injection molded. Because of the size and expense of injection molding equipment, it has been difficult to economically fabricate PE service valves, such as ball valves, having end connections greater than four inches in diameter. This substantially limits the use of thermoplastic valves in natural gas distribution systems where it is preferred to connect valves to pipelines of a diameter of four inches and larger.

It is also known to use metal valves in a PE pipeline. One of the problems encountered in combining metal valves and PE conduit is coupling the members to form a fluid tight seal. The metal components must be sealingly engaged to the PE pipe. This generally requires some type of mechanical connection to be completed between the valve metal components and the PE pipe.

It is well known to use compression fittings to connect metal valves to PE conduit. Examples of transition fittings to join metal valves and PE conduits are disclosed in U.S. Pat. Nos. 2,933,428; 3,025,086; 4,005,880; 4,682,797; 4,712,809; 4,997,214; and 5,265,652.

There is need for a plastic valve in gas distribution and service systems that can be fabricated at a cost substantially less than that associated with injection molding of PE valves and provide the high performance capabilities achieved with metal valves. The plastic valve must be economically manufactured for a wide range of sizes, for example, from ½ inch to eight inches in size. The PE valve must be constructed in a manner that allows modification to be made so that the valve can be custom designed to meet installation requirements at a commercially competitive cost.

SUMMARY OF THE INVENTION

In accordance with the present invention, there is provided a valve assembly that includes an annular body portion fabricated of thermoplastic material. The body portion includes an internal chamber portion with a pair of open end portions to form a flow passage through the body portion. Heating means embedded in the body portion heats the thermoplastic body portion to a temperature for heat fusing. A valve member is positioned in the chamber for movement between an open position directing fluid flow through the chamber and a closed position sealing against fluid flow through the chamber. A valve stem is rotatably supported in the body portion and connected to the valve member to move the valve member between the open and closed positions. A pair of conduit fittings fabricated of thermoplastic material extend into the body open end portions into sealing relation with the valve member in the chamber. Means for actuating the heating means to heat the thermoplastic conduit fittings to form an integral valve body in surrounding relation with the valve member to form a unitary valve assembly upon cooling of the fused thermoplastic material.

Further the present invention is directed to a method for assembling a valve that includes the steps of encapsulating a heating element within an annular body of thermoplastic material. A pair of open end portions extend from opposite sides of an internal chamber of the annular body to form a flow passage through the annular body. A valve member is positioned in the chamber for movement between an open position and a closed position to control the flow of fluid through the chamber. A valve stem extends through the valve body into connection with the valve member for moving the valve member between an open position directing fluid flow through the chamber and a closed position sealing against fluid flow through the chamber. A pair of end fittings fabricated of thermoplastic material are inserted through the open end portions of the chamber into sealing relation with the valve member in the chamber. Heat is supplied to the heating element within the annular body to heat the thermoplastic material to a temperature for melting the thermoplastic material. Heat is transferred from the annular body to the end fittings to melt the end fittings. The molten thermoplastic material of the annular body and the end fittings is fused together in surrounding relation with the valve member. Heating the fused annular body and end fittings is terminated to allow the annular body and end fittings to cool and form a welded unitary valve body surrounding the valve member and valve stem in a valve assembly.

In addition, the present invention is directed to an electrofusion formed valve that includes an electrofusion coupling having a body made of heat-fusing plastic with an internal chamber having opposite open end portions. Electrically conductive material is embedded within the body between the open end portions and surrounding the internal chamber. A valve member is positioned in the internal chamber for movement between a first position permitting fluid flow between the chamber open end portions and a second position obstructing fluid flow between the chamber open end portions. A valve stem extends through the coupling body and is connected at one end to the valve member and supported by the coupling body to move the valve member between the first and second positions. A pair of pipe sections made of heat-fusing plastic extends through the chamber open end portions into sealing engagement with the valve member to support the valve member for movement between the first and second positions. Power means for actuating the electrically conductive material heats the heat-fusing plastic of the coupling and heat is transferred to the heat-fusing plastic of the pipe sections to soften the plastic and fuse together the coupling and the pipe sections to form an unitary valve body surrounding the valve member connected to the valve stem.

Accordingly, a principal object of the present invention is to provide method and apparatus for assembling a valve having a thermoplastic valve body formed by electrofusing a thermoplastic coupling to thermoplastic end fittings with a valve member retained within the integral valve body in sealing relation with the end fittings to control the flow of fluid therethrough.

Another object of the present invention is to utilize an electrofusion system in the fabrication of a plastic valve.

A further object of the present invention is to fabricate a plastic valve from an electrofusion coupling having an encapsulated electrical resistance wire with a pair of plastic pipe ends pressed into the opposite ends of the plastic coupling which is fused to the fittings upon the transfer of heat from electrical current supplied to the wire.

An additional object of the present invention is to form a plastic ball valve for use in natural gas distribution by electrofusing a plastic sleeve to plastic conduit portions with a ball closure member captured between the conduit portions within the sleeve.

A further object of the present invention is to utilize an electrofusion coupling for joining a pair of plastic pipe end fittings with the coupling modified to receive a ball closure member and stem to form an integral valve assembly.

These and other objects of the present invention will be more completely disclosed and described in the following specification, the accompanying drawings, and the appended claims.

DESCRIPTION OF THE PREFERRED EMBODIMENTS

Figure 1:
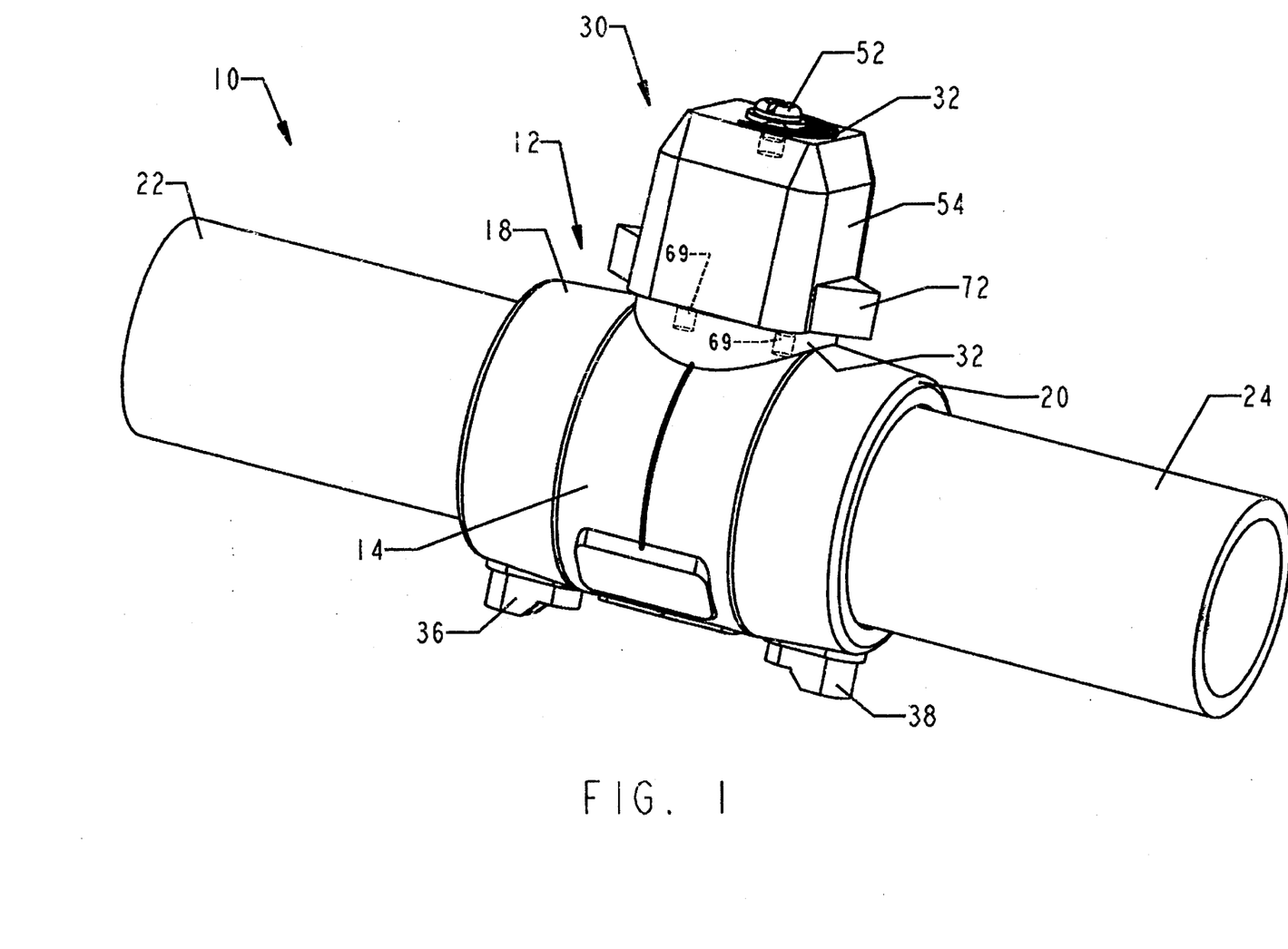
FIG. 1 is an isometric view of a plastic valve having a valve body formed from an electrofusion coupling to connect polyethylene pipe fittings in an integral assembly.
Figure 2:
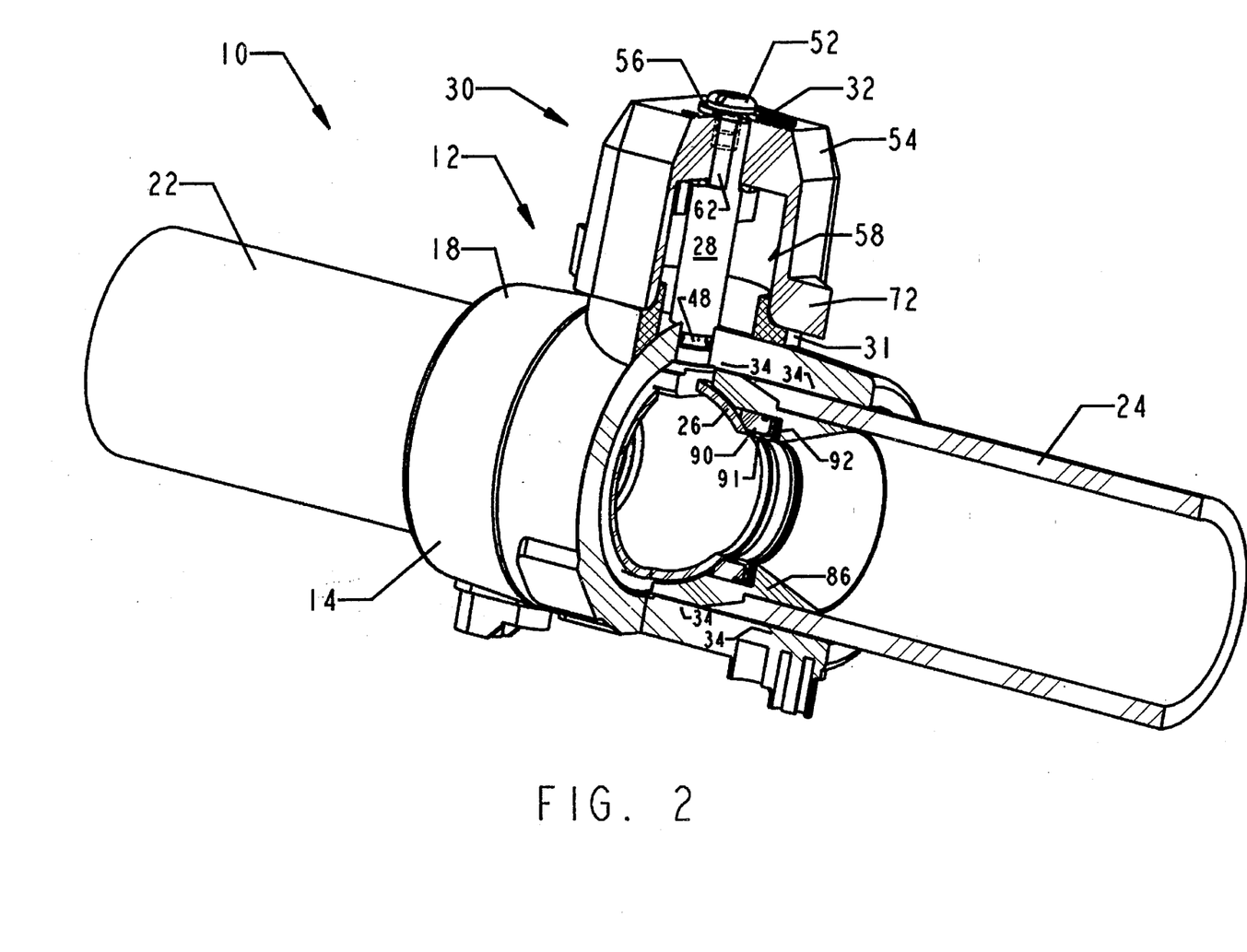
FIG. 2 is an isometric partial sectional view of the plastic valve shown in FIG. 1, illustrating a plastic sleeve fused to plastic pipe fittings in surrounding relation with a ball closure member connected to a valve stem and rotatably supported within the sleeve formed integral with the fittings.
Figure 3:
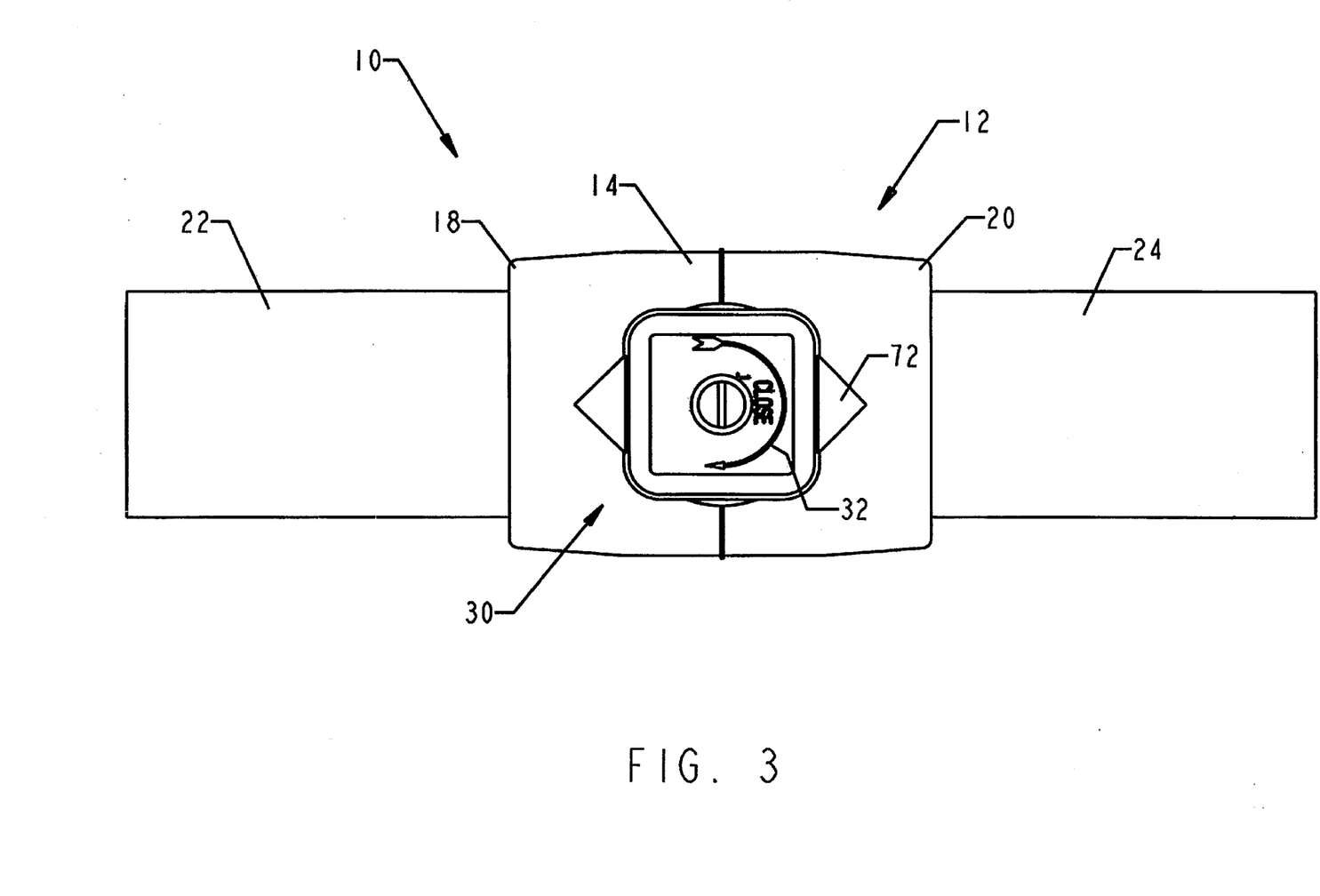
FIG. 3 is a top plan view of the plastic valve shown in FIG. 1, illustrating an actuator cap for rotating the ball closure member between open and closed positions.
Figure 4:
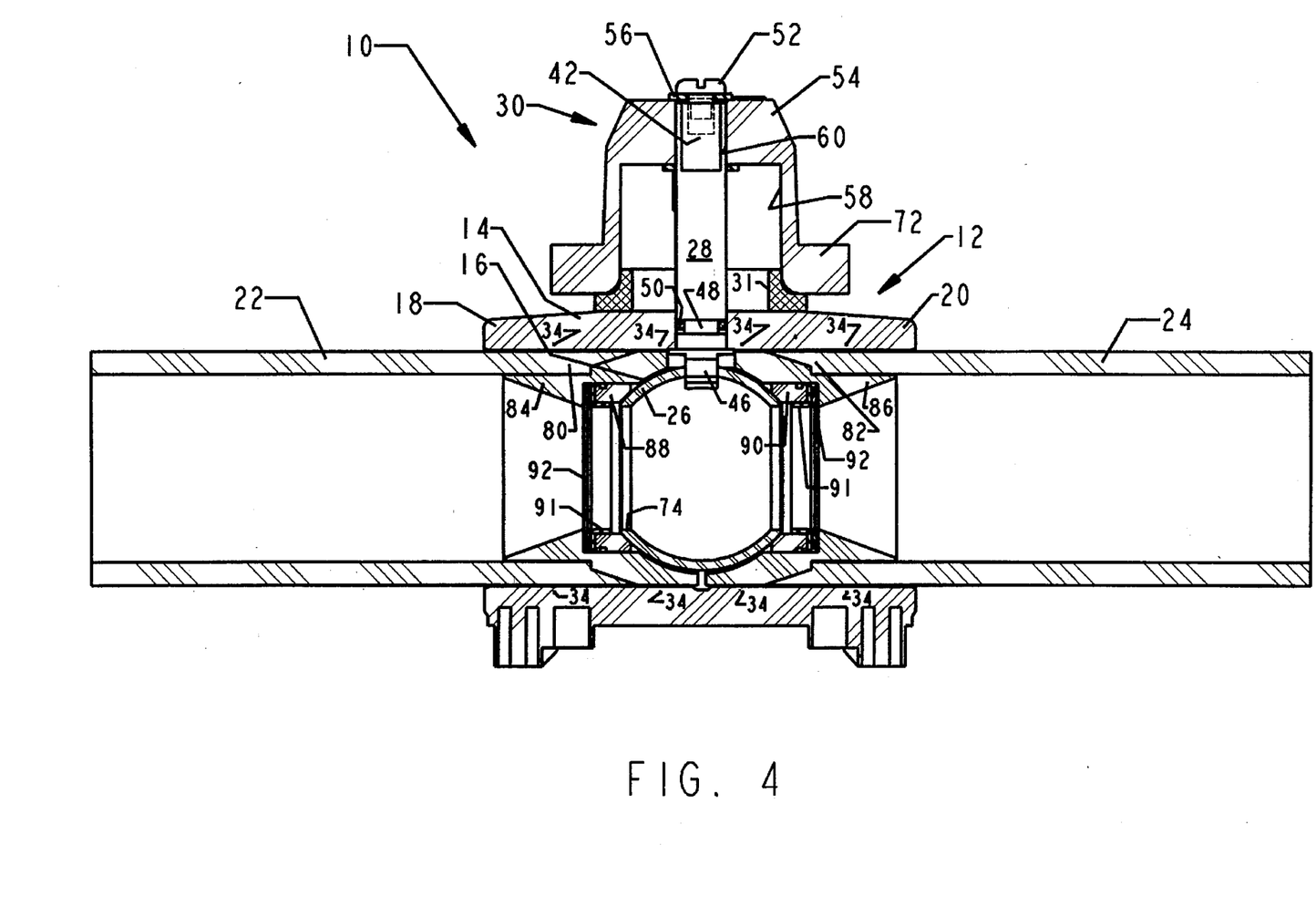
FIG. 4 is a sectional view in side elevation of the plastic valve taken along line IV—IV in FIG. 3, illustrating the valve body formed by an electrofusion coupling welded to plastic pipe fittings in surrounding relation with a metal ball closure member.
Figure 5:
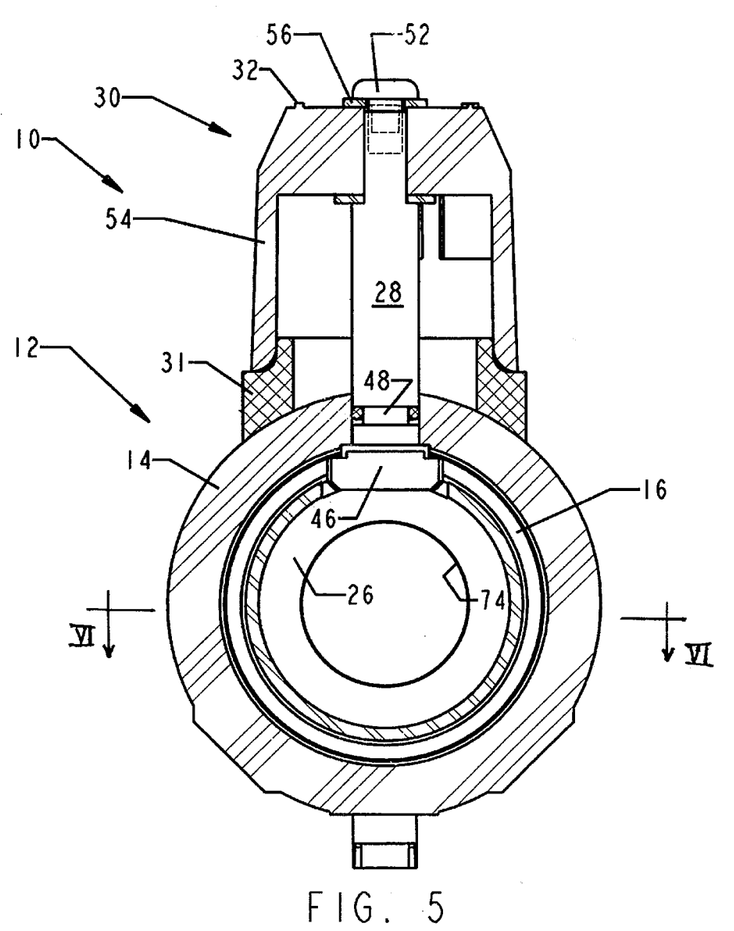
FIG. 5 is a sectional end view of the plastic valve shown in FIG. 1, illustrating the ball closure member connected to a valve stem for rotation within a plastic valve body formed from an electrofusion coupling.

Referring to the drawings and particularly to FIGS. 1-6, there is illustrated a plastic valve assembly generally designated by the numeral 10 adapted for use as a distribution valve or a service valve for controlling the flow of a fluid, either a liquid or a gas, through a piping system. The valve assembly 10 includes a valve body generally designated by the numeral 12 integrally formed by heat fusing a thermoplastic annular portion 14 having an internal valve chamber 16, as illustrated in FIGS. 2 and 4, to a pair of thermoplastic end fittings 22 and 24.

The annular body portion 12 and the end fittings 22 and 24 are formed of thermoplastic material, preferably polyethylene. A valve closure member 26 is rotatably supported within the valve chamber 16 between the adjacent ends of the fittings 22 and 24. The closure member 26 is connected at one end portion to a valve stem 28 which extends through the annular sleeve body 12 to where it is connected at its upper end portion to a valve actuator generally designated by the numeral 30. An annular seal ring or saddle 31 supports the actuator 30 on the body 12 surrounding the stem 28 to form a weather and dirt seal round the stem 28 within the actuator 30. The ring 31 fabricated of elastomeric material which allows it to absorb impact blows imparted downwardly upon the actuator 30.

As illustrated in FIG. 3, the valve actuator 30 is rotatable through 90° to move the closure member 26 between an open position for directing fluid flow through the valve chamber 16 between the pipe end fittings 22 and 24 and a closed position sealing against fluid flow through the valve chamber 16. The closure member 26 is shown in the open position in FIG. 3. Rotation of the valve actuator 30 through an angle of 90° in the direction of arrow 32 inscribed on the top of the actuator 30 moves the closure member 26 to a closed position.

In accordance with the present invention, the valve body 12 is fabricated from the electrofusion sleeve or coupling 14 having an annular body portion that is conventionally used to connect a pair of pipe end portions in a fluid distribution system, such as a natural gas pipeline. The sleeve 14 and pipe end portions 22 and 24 are fabricated of thermoplastic material, such as polyethylene. Electrofusion systems that utilize a sleeve to fuse or weld together pipe sections fabricated of thermoplastic material are disclosed in U.S. Pat. Nos. 4,486,650; 4,571,448; 4,602,148; and 4,642,115, which are incorporated herein by reference.

A conventional electrofusion sleeve is used to form a pipe joint between pipe lengths of thermoplastic material as used in the gas industry. An electrofusion sleeve is formed by injection molding thermoplastic resin with a coil of resistance heating wire encapsulated within the body of the molded sleeve positioned closely adjacent to the inner diameter surface of the sleeve. The valve body 12 of the present invention, as illustrated in greater detail in FIG. 4, is formed from the electrofusion coupling or sleeve 14 which includes the valve chamber 16 and conduit end portions 18 and 20 which are electrofusion welded to the pipe end fittings 22 and 24 in accordance with the present invention.

An electrical resistance heating element 34, such as a foil of electrically conductive material or a coil resistance heating wire is encapsulated within the sleeve 14 closely adjacent to the valve chamber 16. The ends of the wire coil 34 are connected to electrical terminals 36 and 38 shown in FIGS. 1 and 5. The manner in which the wire coil 34 is connected to the terminals 36 and 38 is disclosed in detail in incorporated U.S. Pat. No. 4,602,148. The details of this electrical connection are beyond the scope of the present invention. After the valve body 12 of the present invention is formed by electrofusing the sleeve 14 to the pipe end fittings 22 and 24, the electrical terminals 36 and 38 can be cut from the annular body portion 14 as shown in FIGS. 2 and 4.

The valve body 12 formed from the electrofusion sleeve 14 has a substantially uniform cross-section fabricated entirely of thermoplastic material. The sleeve 14 has a suitable length to form with the end fittings 22 and 24 the valve body 12. The intermediate portion of the sleeve 14 forms the internal valve chamber 16. Sleeve end portions 18 and 20 extend a suitable length from the intermediate portion to receive a fixed length of pipe end fittings 22 and 24.

The pipe fittings 22 and 24 are also fabricated entirely of thermoplastic material. The end fittings 22 and 24 have a suitable length to facilitate their connection by butt fusion or electrofusion to the ends of polyethylene pipe in a distribution or service line in which the valve assembly 10 is installed. With this arrangement, the valve body 12 provides a fluid passage for the conveyance of fluid controlled by the valve closure member 26 between the pipe fittings 22 and 24.

Before the pipe fittings 22 and 24 and the sleeve or coupling 14 are assembled, a bore 40 is drilled through the sleeve at the midpoint between the end portions 18 and 20 and transverse relative to the longitudinal bore through the sleeve 14. When the bore 40 is drilled through the electrofusion sleeve 14 care is taken to avoid cutting the wire heating element 34 that extends in a continuous coil the length of the sleeve.

After the bore 40 is drilled through the sleeve 14, the valve stem 28 is inserted in the bore 40. This is accomplished by inserting the stem 28 through one of the sleeve end portions 18 and 20. Stem upper end portion 42 is advanced upwardly through the bore 40. The stem 28 is advanced through the bore 40 until an enlarged shoulder 44 at stem lower end portion 46 contacts the inner surface of the valve body 12 around the bore 40. This prevents the stem 28 from passing entirely through the bore 40. The stem 28 includes an annular recessed portion 48 positioned above and closely adjacent to the shoulder 44. The recessed portion 48 is positioned within the bore 40 to receive an O-ring 50 that sealingly surrounds the valve stem 28 within the bore 40.

The stem 28 is provided with a preselected length to extend above the valve body 12 to receive the valve actuator 30. The upper end portion 42 of the valve stem 28 includes a threaded bore for receiving a tamper proof threaded bolt 52 that retains an actuator cap 54 nonrotatably connected to the stem 28. A washer 56 supports the head of the bolt 52 on the upper surface of actuator cap 54.

Figure 6:
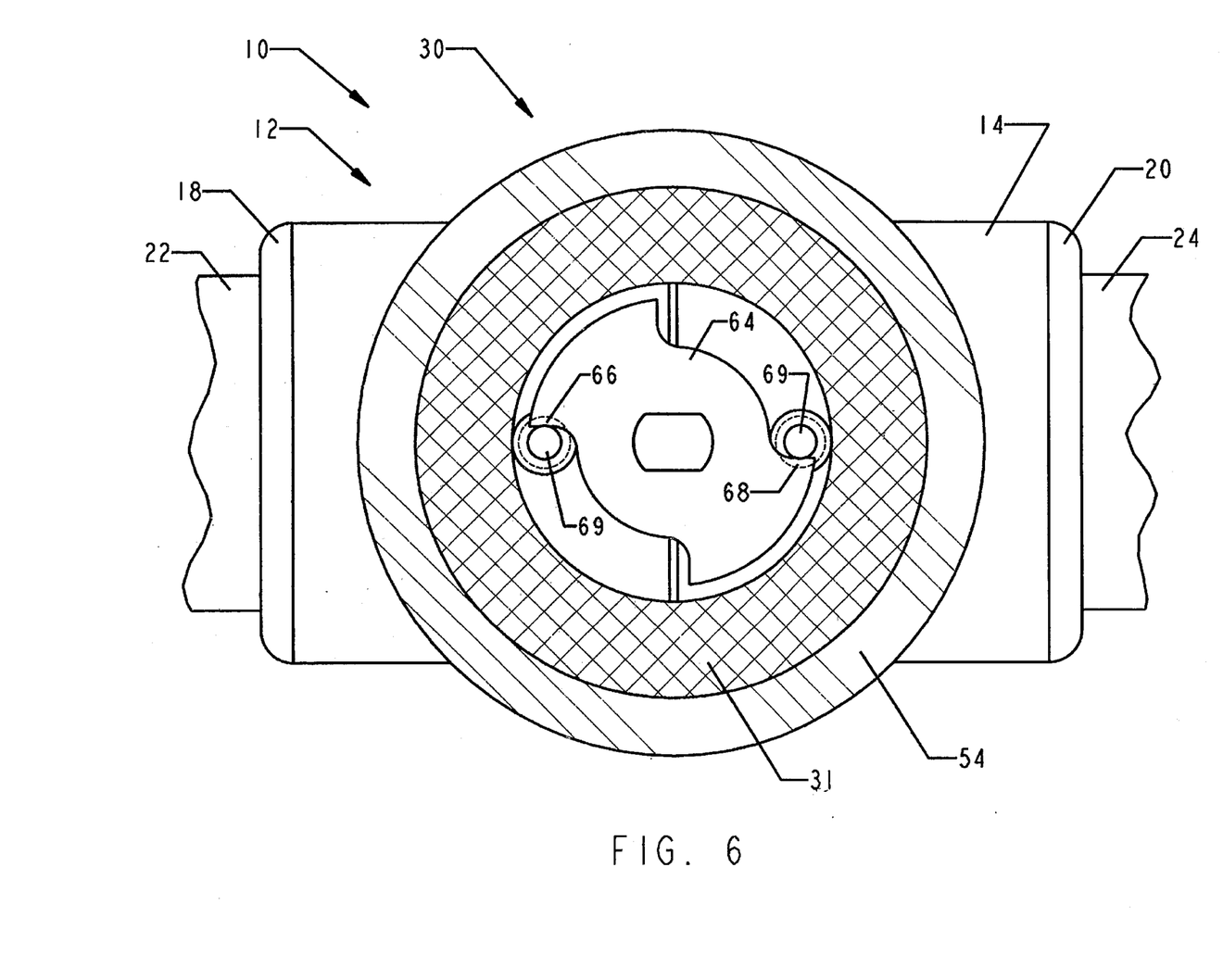
FIG. 6 is a top plan sectional view of the plastic valve taken along line VI—VI in FIG. 5, illustrating stops on the valve stem for limiting rotation of the valve stem through 90° between the open and closed positions.

As seen in FIGS. 2, 4, and 6, the actuator cap 54 has a cup-shaped configuration formed by an enlarged internal bore portion 58 and a reduced internal bore portion 60. The internal bore portion 60 includes flats for receiving flat planar surfaces 62 (shown in FIG. 2) on the stem upper end portion 42 to prevent relative rotation between the cap 54 and the stem 28. This also assures that the cap 54 is correctly positioned on the valve stem for indicating the position of the valve member 26 in the open or closed positions.

As seen in FIGS. 1 and 6, the stem 28 includes a stop plate 64 nonrotatably mounted thereon. The plate 64 includes abutment shoulders 66 and 68 engageable with stop pins 69 securely oppositely of one another to the sleeve 14. The pins 69 are axially aligned with the valve chamber bore. Rotation of the stem 28 is limited to 90° between the open and closed positions of the valve member 26 by contact of the plate shoulders 66 and 68 with the stop pins 69.

The actuator cap 54, as seen in FIGS. 1-3, includes directional flow indicators 70 and 72 positioned externally on opposite sides of the base of the cap 54. The cap 54 is connected by the bolt 52 to the stem 28 so that the indicators 70 and 72 are axially aligned with the flow path through the valve assembly 10 when the valve closure member 26 is in the open position as illustrated in FIGS. 1-3.

After the valve stem 28 is mounted in the valve body 12, the valve closure member 26 is then inserted through one end of the valve body 12 into the chamber 16 for connection to a lug end portion 46 on the lower end of the stem 28. In one embodiment, the closure member 26 is in the form of a ball or sphere having a transverse passage 72 that is movable into and out of alignment with the flow passage formed by the conduit end portions 18 and 20 of the sleeve 14. It also should be understood that the valve closure member 26 may be fabricated of a selected material, such as polyethylene, metal, and the like. In addition, the sleeve 14 can be adapted to receive a closure member 26 in the embodiment of a plug or a butterfly-type closure member.

After the valve stem 28 and the ball closure member 26 are assembled and rotatably mounted within the valve chamber 16, the pipe end fittings 22 and 24 are inserted. In the embodiment illustrated in FIGS. 1-6, the fittings 22 and 24 include adjacently positioned beveled end portions 80 and 82 adapted to receive spacers 84 and 86 which are also fabricated of thermoplastic material. The spacers 84 and 86 are wedged into engagement with the fitting end portions 80 and 82. The spacers 84 and 86 have a curved inner surface forming the valve chamber 16 for receiving the outer configuration of the ball closure member 26.

Each of the spacers 84 and 86 is provided with a recessed portion opposite the surface of the ball closure member 26 for receiving annular valve seat rings 88 and 90. The inner surface of the seat rings 88 and 90 sealingly engages the closure member 26. The outer surface of the seat rings 88 and 90 is engaged by ring retainers 91 that function to maintain the geometry of the seat rings. The opposite surface of each ring retainer 91 abuts Belleville spring washers 92. The Belleville washers 92 are compressed between the seat ring retainer 91 and the spacers 84 and 86 on the ends of the pipe fittings 22 and 24. With this arrangement, the Belleville spring washers 92 exert a biasing force on the ball closure member 26.

With the spring biased seat rings 88 and 90 mounted by the spacers 84 and 86 on the beveled end portions 80 and 82 of the fittings 22 and 24, the fittings 22 and 24 are advanced through the ends 18 and 20 of the sleeve 14 into surrounding relation with the ball closure member 26. The sleeve 14 and end fittings 22 and 24 are then placed in a press to apply opposing axial forces on the fittings 22 and 24 to compress the Belleville washers 92 to exert a preselected load through the seat rings 88 and 90 on the ball closure member 26.

With the sleeve 14 and fittings 22 and 24 positioned in a press, the electrofusion wire 34 is actuated by supplying current thereto to fuse the sleeve 14 to the pipe end fittings 22 and 24 and form an integral valve body 12. The fusion process is actuated by connecting the terminals 36 and 38 to a source of electrical power, such as a 110 DC volt, 30 amp source. Any constant voltage power source with adequate current capacity can be used to actuate the coiled electrical resistance heating element 34 encapsulated within the sleeve 14.

Electrical power is supplied through the terminals 36 and 38 to the wire coil 34 to heat the thermoplastic material forming the sleeve 14. Current is supplied for a preselected period of time to raise the thermoplastic material to its melting temperature. The heat from the sleeve 14 is transmitted by conduction to the interface between the sleeve 14 and the fittings 22 and 24. The heat transmitted from the sleeve 14 raises the temperature of the PE fittings 22 and 24 to their melting temperature. At the melting temperature, the thermoplastic material forming the sleeve 14 and fittings 22 and 24 softens and flows together at the interface forming an integral structure. The sleeve 14 and fittings 22 and 24 are thus welded together with the valve member 26 captured therebetween.

Heating the sleeve 14 and end fittings 22 and 24 is controlled so as not to heat the thermoplastic material to a temperature where the material is consumed preventing fusion of the valve body to the end fittings. The known electrofusion systems include a number of different types of control devices for assuring that a good electrofusion bond is achieved by obtaining the proper temperature and pressure in a joint. In one embodiment as shown in FIGS. 1 and 2, molten polyethylene material flows through a fusion well and mechanically triggers a microswitch (not shown) to shut off the supply of electrical current to the wire coil 34. This technique is self-regulating so that at the point where the microswitch is triggered, the material forming the sleeve 14 and end fittings 22 and 24 has fused together to form a permanent welded joint connecting the sleeve 14 to the end fittings 22 and 24 which becomes the integral valve body 12. Other techniques for determining if the desired temperature for fusion has been reached include using a thermocouple or a timer to cut off the electrical power to the coil 34.

Once fusion has taken place and the microswitch is triggered, the current flow to the wire coil 34 is terminated and the fusion formed integral valve body 12 is permitted to cool down. The cool down period takes place between the time electrical power to the wire coil 34 is cut off until the fused assembly 10 reaches an acceptable temperature. For pipe fittings having a four inch diameter, a typical cool down period is thirty minutes. Depending upon the gap between the electrofusion sleeve forming the valve body 12 and the end fittings 22 and 24 more time may be required to create the temperature and pressure to fuse the valve body to the end fittings. Also in the fusion process, the sleeve 14 and fittings 22 and 24 are provided with cold zones, as known in the art, to contain the molten plastic which is also under elevated pressure during fusion. The cold zone is wide enough to contain the molten plastic.

An acceptable joint or fusion of the sleeve 14 to the end fittings 22 and 24 is achieved when the joint is placed in tension and either one of the pipe end fittings 22 and 24 fails before the joint between the sleeve 14 and the end fittings 22 and 24 fails. The cool down time is based on a number of factors which determine the period of time to allow the molten polyethylene at the fusion zone between the sleeve 14 and the pipe fittings 22 and 24 to solidify and gain sufficient strength to carry loads. The factors that are considered in the cool down time include the heat input supplied by the electrical power source, the wall thickness of the sleeve 14 and the end fittings 22 and 24, and the ambient air temperature.

Figure 7:
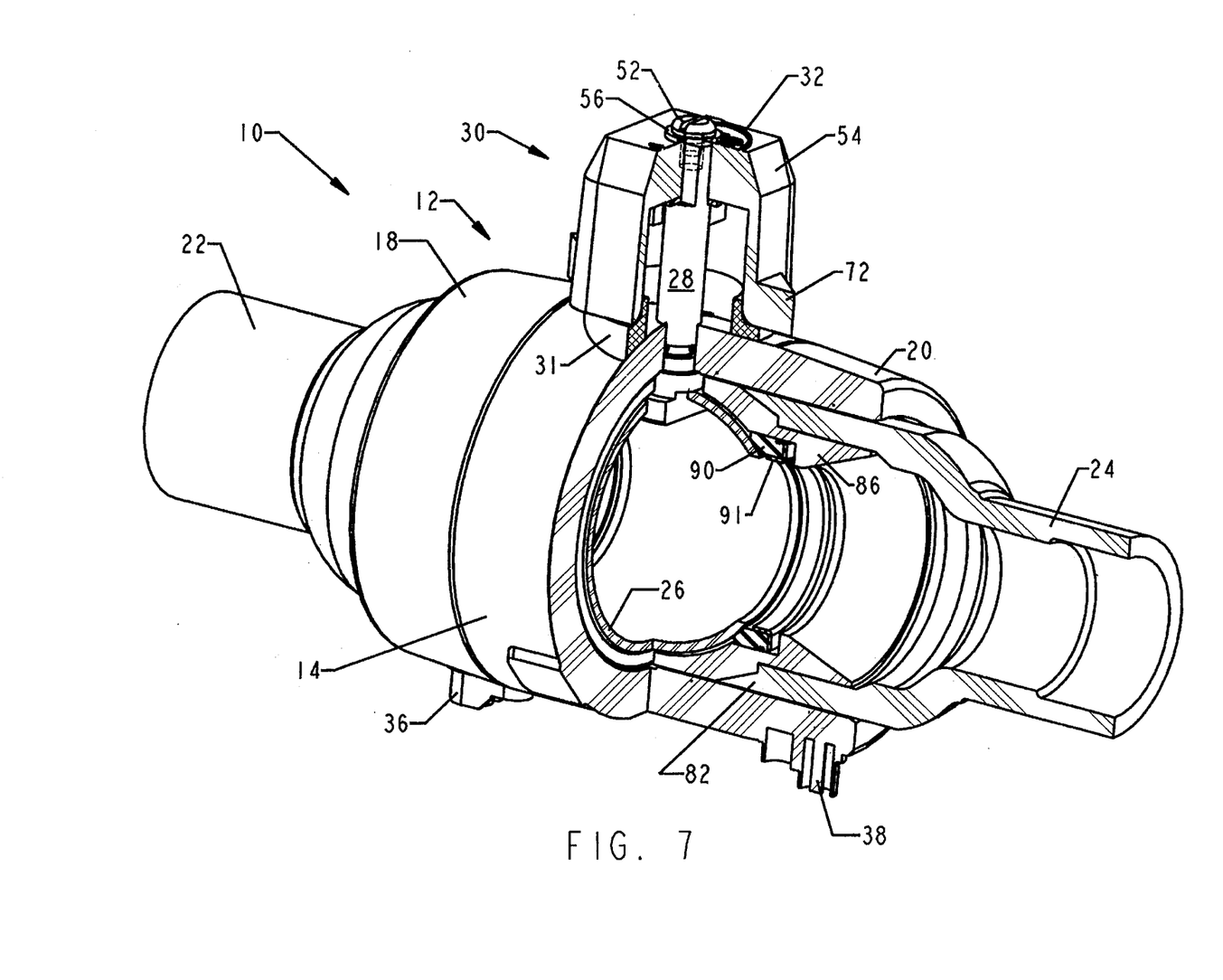
FIG. 7 is an isometric sectional view similar to FIG. 2, illustrating an embodiment of the plastic valve having an enlarged valve body to provide an unrestricted valve opening between the connected pipe fittings.
Figure 8:
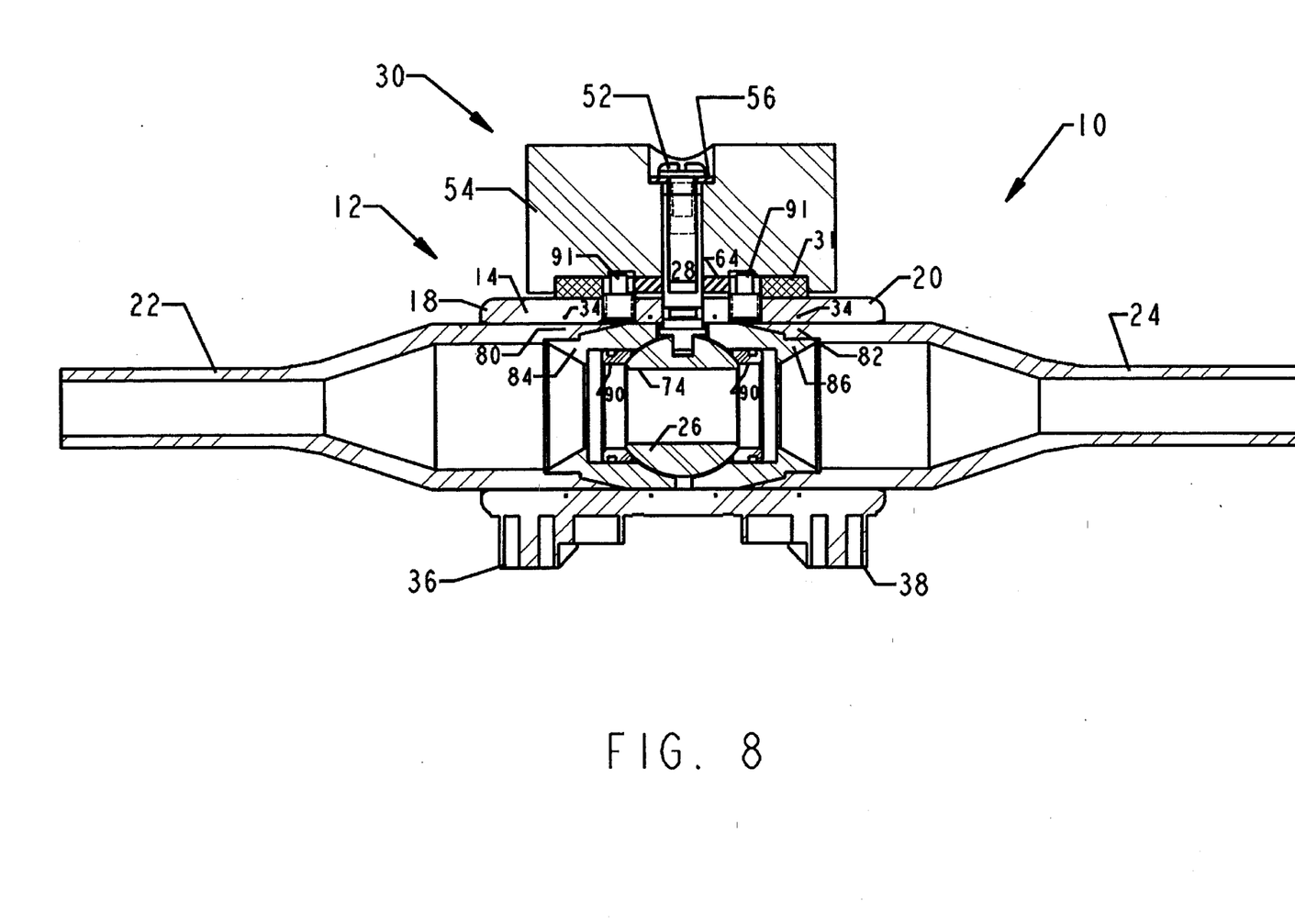
FIG. 8 is a sectional view in side elevation of the embodiment of the plastic valve shown in FIG. 7.
Figure 9:
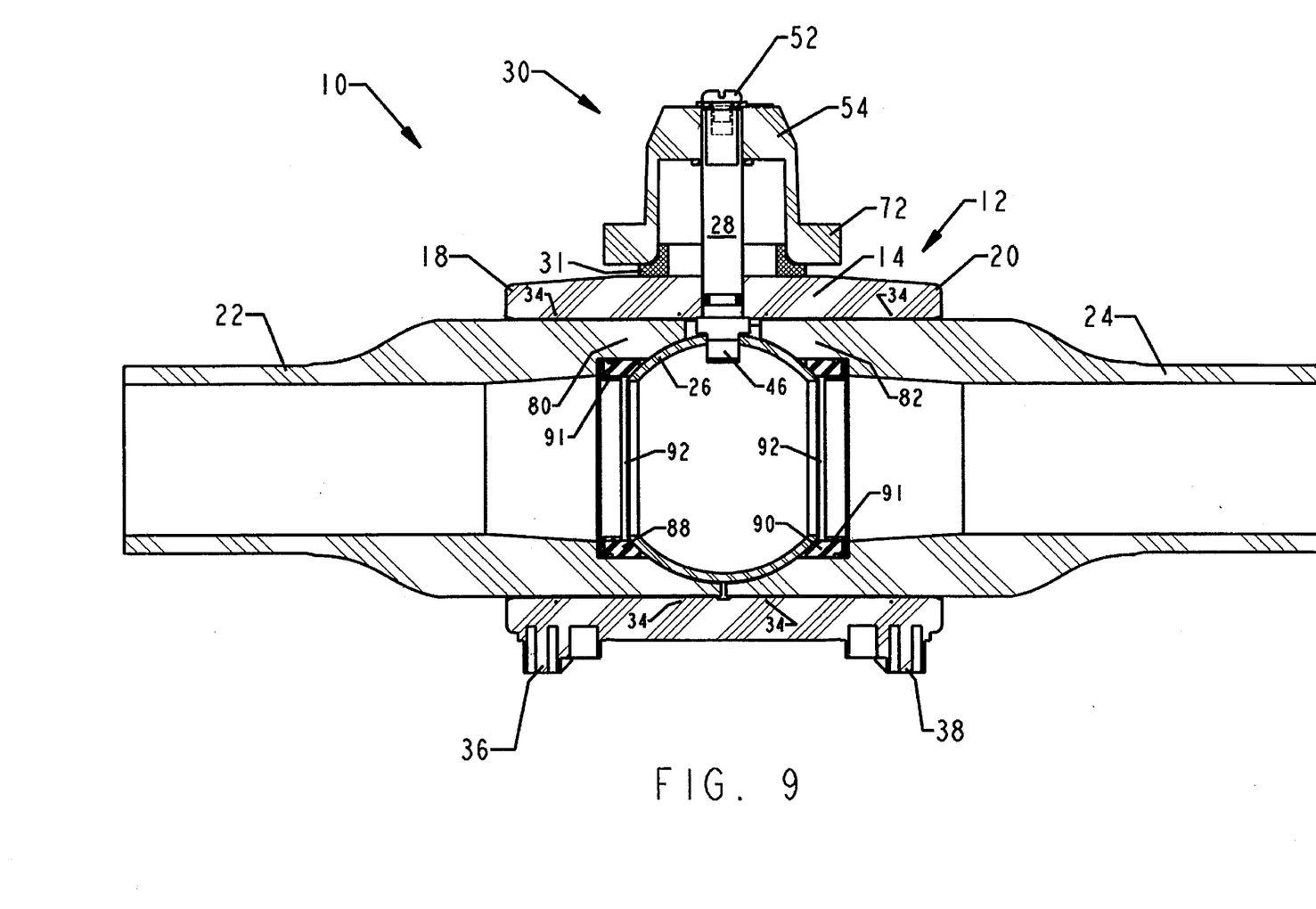
FIG. 9 is a sectional view in side elevation of additional embodiment of the plastic valve, illustrating enlarged end fittings for supporting a ball closure member.

Now referring to FIGS. 6 and 7, there is illustrated another embodiment of the valve assembly 10 of the present invention formed by the electrofusion process in which like numerals shown in FIGS. 1–6 refer to like parts in FIGS. 7–9. With the embodiment of the valve assembly 10 shown in FIGS. 1–6, the diameter of the fluid passage 74 through the ball member 26 is less than the diameter of the fluid passage through the pipe fittings 22 and 24. Consequently, a restriction in the flow through the valve 10 assembly is encountered. This occurs for example when the diameter of the passageway 74 through the ball member 26 is two inches and the inner diameter of the pipe fittings 22 and 24 shown in FIG. 4 is three inches.

FIGS. 7 and 8 illustrate an embodiment of the valve assembly 10 which includes an enlarged ball and seat combination to produce a "full ported" valve where the opening 74 in the ball 26 is equal to the inside diameter of the pipe fittings 22 and 24 at their extreme end portions. With this arrangement, the interior diameters of the sleeve 14, the end fittings at the beveled end portions 80 and 82, and the spacers 84 and 86 is increased. The fitting beveled end portions 80 and 82 are expanded to permit a reduction in the diameter of the end fittings 22 and 24 to a diameter of the PE conduit. No restriction in flow is experienced as fluid passes through the ball member 26 into the pipe fittings 22 and 24.

In the embodiment of the valve assembly 10 shown in FIG. 9, the spacers 84 and 86 are eliminated. The pipe end fittings 22 and 24 are customized to include an expanded wall thickness to provide an increased flow passageway out of the ball member. With this embodiment, the valve seat rings 88 and 90 are supported within the cut-out end portions of the pipe end fittings 22 and 24 and the spacers 84 and 86 are eliminated.

A larger ball valve 30 and valve seat combination 88 and 90 are used in this embodiment to provide a "full ported" valve where the opening through the valve closure member 26 corresponds in diameter to the inner diameter of the pipe fittings 22 and 24. With this arrangement, the valve body 12 is formed from a three inch coupling 14 and the extreme end portions of the pipe fittings 22 and 24 have a two inch inner diameter corresponding to a two inch diameter opening through the ball closure member 26.

According to the provisions of the patent statutes, I have explained the principle preferred construction, and mode of operation of my invention and have illustrated and described what I now consider to represent its best embodiments. However, it should be understood, that within the scope of the appended claims, the invention may be practiced otherwise than as specifically illustrated and described.

I claim:

1. A valve assembly comprising, an annular body portion fabricated of thermoplastic material, said annular body portion including an internal chamber with a pair of open end portions to form a flow passage through said annular body portion, heating means embedded in said annular body portion to heat said thermoplastic body portion to a temperature for heat fusing, a valve member positioned in said chamber for movement between an open position directing fluid flow through said chamber and a closed position sealing against fluid flow through said chamber, a valve stem rotatably supported in said body portion and connected to said valve member to move said valve member between the open and closed positions, a pair of conduit fittings fabricated of thermoplastic material extending into said body open end portions into sealing relation with said valve member in said chamber, and means for actuating said heating means to heat said thermoplastic body portion to a temperature to fuse said body portion to said thermoplastic conduit fittings to form an integral valve body in surrounding relation with said valve member to form a unitary valve assembly upon cooling of said fused thermoplastic material.

2. A valve assembly as set forth in claim 1 which includes, a pair of seat rings retained by said pair of conduit fittings in said chamber in surrounding relation with said valve member, said seat rings forming a valve seat in said chamber upon fusing of said body portion to said conduit fittings, and said valve member centrally positioned in said chamber in engagement with said valve seat for movement between the open and closed positions.

3. A valve assembly as set forth in claim 2 which includes, biasing means carried by said seat rings on said conduit fittings for exerting opposing forces on said valve member to maintain said valve member centrally positioned within said valve body and movable between said open and closed positions.

4. A valve assembly as set forth in claim 3 in which, said conduit fittings include end portions pressed through said open end portions to a position in said chamber for compressing said biasing means against said valve member to exert a preselected load on said valve member, and said conduit fittings fused to said body portion to fix the position of said end portions within said chamber to maintain a preselected compressive force on said biasing means for exerting the preselected load on said valve member.

5. A valve assembly as set forth in claim 1 in which, said annular body portion includes an electrofusion coupling having an axially extending body with a longitudinal bore extending between said open end portions, a bore extending through said body portion into said chamber and transverse to said longitudinal bore for receiving said valve stem, and electrically conductive material embedded within said body portion and surrounding said longitudinal bore to generate heat for fusion upon the supply of electrical current thereto.

6. A valve assembly as set forth in claim 5 in which, said electrofusion coupling is a cylindrical sleeve fabricated of thermoplastic material, said sleeve having a substantially uniform wall thickness defining an outer cylindrical surface and an inner cylindrical surface, and said sleeve inner cylindrical surface forming with said conduit fittings a valve chamber for receiving said valve member and said valve stem.

7. A valve assembly as set forth in claim 5 in which, said electrically conductive material includes a length of electrical resistance wiring extending in a coiled configuration within said sleeve wall, and said wiring embedded in said sleeve wall and positioned closely adjacent to said inner cylindrical surface.

8. A valve assembly as set forth in claim 7 in which, said conduit fittings include end portions pressed into opposite ends of said sleeve into sealing relation with said valve member, and said end portions of said fittings positioned in underlying abutting relation with said sleeve inner cylindrical surface.

9. A valve assembly as set forth in claim 8 in which, said electrical resistance wiring is supplied with electrical current to heat said sleeve to a heat-fusing temperature for the transfer of heat through said sleeve wall to said end portions of said fittings for fusing said fittings to said sleeve to maintain said valve member centrally positioned within said sleeve between said end portions of said fittings.

10. A valve assembly as set forth in claim 1 in which, said valve member includes a ball member having a through fluid passage communicating with said conduit fittings, and said conduit fittings having end portions forming a valve seat to receive and support said ball member for rotational movement through 90° where said fluid passage communicates with said conduit fittings in the open position and said fluid passage is sealed from said conduit fittings in the closed position.

11. A valve assembly as set forth in claim 10 in which, said end portions of said conduit fittings each have an enlarged diameter forming a valve seat for rotatably supporting said ball member, said enlarged diameter end portion of each conduit fitting exceeding the diameter of the remaining portion of said conduit fitting, and said enlarged diameter end portion of each conduit fitting exceeding the diameter of said flow passage through said valve body to provide unobstructed fluid flow between said conduit fittings and said valve body when said ball member is in said open position.

12. A method for assembling a valve comprising the steps of, encapsulating a heating element within an annular body of thermoplastic material, extending a pair of open end portions from opposite sides of an internal chamber of the annular body to form a flow passage through the annular body, positioning a valve member in the chamber for movement between an open position and a closed position to control the flow of fluid through the chamber, extending a valve stem through the valve body into connection with the valve member for moving the valve member between an open position directing fluid flow through the chamber and a closed position sealing against fluid flow through the chamber, inserting a pair of end fittings fabricated of thermoplastic material through the open end portions of the chamber into sealing relation with the valve member in the chamber, supplying heat to the heating element within the annular body to heat the thermoplastic material to a temperature for melting the thermoplastic material, transferring heat from the annular body to the end fittings to melt the end fittings, fusing together the molten thermoplastic material of the annular body and the end fittings in surrounding relation with the valve member, and terminating heating the fused annular body and end fittings to allow the annular body and end fittings to cool and form a welded unitary valve body surrounding the valve member and valve stem in a valve assembly.

13. A method for assembling a valve as set forth in claim 12 which includes, embedding the heating element including an electrically conductive material within the annular body, supplying electrical current to the conductive material, heating the thermoplastic material from the flow of current through the heating element to a temperature where the thermoplastic material softens and heat is transferred to the end fittings to soften the thermoplastic material thereof, and fusing together the softened thermoplastic material of the annular body and end fittings to form a welded integral valve body.

14. A method for assembling a valve as set forth in claim 12 which includes, forming the annular body from a connection sleeve made of thermoplastic material and having an encapsulated electrically conductive material, forming a bore through the sleeve transverse to the flow passage, rotatably supporting the valve stem in the sleeve with a lower end portion of the valve stem connected to the valve member and an upper end portion of the valve stem connected to a valve actuator, pressing the end fittings through the end portions of the sleeve to exert a preselected load on the valve member to capture the valve member between the end fittings within the sleeve, and supplying current to the electrically conductive material to heat the sleeve and end fittings to a temperature for fusing together the sleeve and end fittings to form the unitary valve body and maintain the valve member centrally positioned in the valve body for movement between the open and closed positions.

15. A method for assembling a valve as set forth in claim 12 which includes, centrally positioning the valve member in the chamber between the open end portions, positioning force biasing devices between the end fittings and the valve member, pressing the end fittings into the chamber to compress the force biasing devices to exert a preselected axial load on the valve member, and maintaining the compress force applied by the end fittings on the valve member by electrofusing the annular body to the end fittings forming the unitary valve body to fix the position of the end fittings relative to the valve member.

16. A method for assembling a valve as set forth in claim 12 which includes, providing the chamber portion with an enlarged diameter to receive the valve member having an opening with a diameter equal to the inner diameter of the end fittings to form a full ported valve where the flow of fluid through the valve member into the end fittings is unobstructed.

17. An electrofusion formed valve comprising, an electrofusion coupling including a body made of heat-fusing plastic having an internal chamber with opposite open end portions, electrically conductive material embedded within said body between said open end portions and surrounding said internal chamber, a valve member positioned in said internal chamber for movement between a first position permitting fluid flow between said chamber open end portions and a second position obstructing fluid flow between said chamber open end portions, a valve stem extending through said coupling body and connected at one end to said valve member and supported by said coupling body to move said valve member between said first and second positions, a pair of pipe sections made of heat-fusing plastic extending through said chamber open end portions into sealing engagement with said valve member to support said valve member for movement between said first and second positions, and power means for actuating said electrically conductive material to heat the heat-fusing plastic of said coupling and transfer heat to the heat-fusing plastic of said pipe sections to soften the plastic and fuse together said coupling and said pipe sections to form an unitary valve body surrounding said valve member connected to said valve stem.

18. An electrofusion formed valve as set forth in claim 17 which includes, a valve seat formed by said pipe sections positioned in said chamber, biasing means compressed by said valve seat in surrounding relation with said valve member for exerting a preselected axial load on said valve member, said pipe sections pressed into said chamber into compressive relation with said biasing means for exerting the preselected load on said valve member, and said pipe sections welded by electrofusion to said coupling to maintain the pipe sections in the desired compressive relation with the biasing means for obtaining the preselected load on the valve member.

19. An electrofusion formed valved as set forth in claim 17 in which, said electrically conductive material is an electrical resistance wire extending in a coiled configuration within the body of said coupling surrounding said internal chamber, said wire embedded within the body of said coupling and positioned closely adjacent to an inner surface of the coupling, and said pipe sections being pressed into abutting relation with said coupling inner surface to receive heat transferred from said coupling upon the flow of current through said wire for fusing together said pipe sections and said coupling.

20. An electrofusion formed valve as set forth in claim 17 in which, said coupling is a substantially cylindrical sleeve used for connecting pipe sections by electrofusion, and said sleeve being converted into said valve body of a plastic valve by electrofusing to said pipe sections to form a welded unitary structure to capture a ball valve member between said pipe sections within said sleeve and rotatably connected to said valve stem extending through a transverse bore in said sleeve.

* * * * *

UNITED STATES PATENT AND TRADEMARK OFFICE
CERTIFICATE OF CORRECTION

PATENT NO : 5,639,394
DATED : June 17, 1997
INVENTOR(S): Richard W. Conley

It is certified that error appears in the above-identified patent and that said Letters Patent is hereby corrected as shown below:

| | |
|---|---|
| Column 1, line 12 | after "gas" insert -- , --. |
| Column 1, line 34 | after "pipeline" delete 'eliminate' and insert -- eliminates --. |
| Column 5, line 22 | after "coupling" delete 'or' and insert -- of --. |
| Column 5, line 43 | after "form" insert -- , --. |
| Column 5, line 43 | after "24" insert -- , --. |

Signed and Sealed this

Twenty-first Day of April, 1998

Attest:

BRUCE LEHMAN

Attesting Officer

Commissioner of Patents and Trademarks